Patented July 12, 1932

1,867,040

UNITED STATES PATENT OFFICE

JAMES F. WALSH, OF EAST ORANGE, AND AMERIGO F. CAPRIO, OF NEWARK, NEW JERSEY, ASSIGNORS TO CELLULOID CORPORATION, A CORPORATION OF NEW JERSEY

SOLVENT FOR ORGANIC ESTERS OF CELLULOSE

No Drawing.    Application filed June 23, 1928.    Serial No. 287,884.

This invention relates to solutions and compositions containing cellulose acetate or other organic esters of cellulose, either alone or in the presence of plastifiers or other modifying agents.

In the art of making acetyl cellulose compositions it has been desired to find solvents or menstrua which will not tend to separate from the acetyl cellulose upon evaporation. While many solvents or mixtures of solvents for cellulose acetate and other organic esters of cellulose are known, the use of the same has been considerably limited by the fact that their solvent properties decrease materially at low temperatures and also because many of these solvents do not possess a high miscibility with the various compounds used as plastifiers for such esters of cellulose. Solvents that have been found to give excellent results with nitro cellulose are usually of comparatively little use in connection with the organic esters of cellulose. It has, therefore, long been a desideratum among those skilled in the cellulose art to find a menstruum which will evaporate fairly rapidly but uniformly and which at the same time will form a solvent mixture with the plastifiers usually employed in conjunction with cellulose acetate and similar esters of cellulose. In other words, a solvent for cellulose acetate which will be comparable in its action to the action of alcohol on pyroxylin.

An object of this invention is to provide a suitable solvent for cellulose acetate.

Another object of this invention is to provide a mixed solvent for cellulose acetate and other organic esters of cellulose which will evaporate uniformly from solutions of such esters.

Still another object of our invention is to provide a solvent for organic esters of cellulose which will be compatible with the plastifiers and modifying agents usually employed in conjunction with such esters. Other objects and advantages will appear from the following detailed description.

Many solvents for cellulose acetate and other organic esters of cellulose are, of course, known. While certain esters and ketones have been used alone as solvents for such organic esters of cellulose, the general practice has been to employ mixed solvents. As examples of such mixed solvents the following may be given: mixtures of alcohols with benzol, alcohol with other hydrocarbons, alcohol with chlorinated hydrocarbons, acetone and alcohol, ethers of ethylene glycol and benzene, etc., etc. These various mixtures, however, have many objectionable features. Among these objectionable qualities is the absence of good solvent power for the cellulose esters in the cold. Also many of these solvents show an unequal evaporating tendency when used in conjunction with organic esters of cellulose which property causes apparently effective acetyl cellulose solutions to become crumbly or of weak structure upon evaporation of the solvent. This unequal evaporation of the solvent also results in the cellulose esters showing a lack of conversion towards the end of the rolling or kneading processes. Thus, where a benzol-alcohol mixture is employed, we find a lack of the desired solvent activity and in instances of solvent mixtures which depend upon acetone for the active ingredient, we have a combination in which the strong solvent element tends to evaporate before the remaining ingredients, leaving behind a mixture which is incapable of maintaining solution or combination.

We have now found a mixed solvent which does not possess the objectionable features above pointed out. The mixed solvent which we have invented not only is a solvent for the organic cellulose esters at normal or slightly elevated temperatures but also retains its solvent powers at low temperatures. The mixture also has the highly desirable property of evaporating uniformly from solutions wherein it is employed as a solvent. We have compounded our solvent from ethyl acetate, ethyl alcohol and water, mixed in proper proportions. Thus we have found that a solvent comprising 82½ parts by weight of anhydrous ethyl acetate, 8½ parts by weight of absolute ethyl alcohol and 9 parts by weight of water possesses the desirable properties above enumerated.

This example is, of course, given merely by way of illustration. The alcohol employed need not be absolute alcohol as ordinary alcohol may be used and the amount of water added to the mixture correspondingly reduced. Also alcohol containing a small amount of benzene can be employed, alcohol denatured in accordance with the United States (Internal Revenue) formula 2B having been successfully employed. In like manner it is not absolutely necessary for anhydrous ethyl acetate to be used for producing our solvent. Other lower aliphatic alcohols, for example, methyl alcohol, propyl alcohols, and butyl alcohols, can be used instead of ethyl alcohol and the ethyl acetate can be replaced by other acetic esters of homologous aliphatic alcohols, such as methyl acetate, the proply acetates and the butyl acetates.

While we have above given definite workable proportions, we do not limit ourselves thereto. These proportions can, of course, be varied over a wide range just so long as the objectionable evaporation difficulties previously pointed out do not arise. The proportion of water above pointed out should be diminished rather than increased whereas the alcohol content should be increased in the event that a solvent mixture other than that about given is desired. Solvents or menstrua prepared along these lines overcome the tendency of the cellulose acetate or other organic esters of cellulose to separate from the solvent when the same is worked up on heated rolls. The only limitation upon the amounts of alcohol and water is that there should not be enough of either to approach nonconversion or to effect a weakening of the mass. The amount of ethyl alcohol should not be increased too much for an excess of this component tends to prevent the maintaining of an easy and thorough conversion of the mass with nonseparation of the various constituents.

The solvent or menstruum prepared according to the above example was employed as a solvent aid in the manufacture of plastic compounds. Upon evaporation the menstruum was volatilized uniformly with no deleterious effect upon the plastic mass remaining. The cohesiveness of the latter was very good and its strength unimpaired. Similar beneficial properties were also found when the solvent was employed for film or lacquer manufacture, the uniform rate of evaporation precluding blushing or blooming of the film or lacquer.

From the above it will be evident to those skilled in the art that a solvent of unusual properties has been discovered by us. The solvent powers of the ethyl acetate are apparently greatly enhanced when the same is mixed with water within certain defined limits. Too large an addition of water will, of course, result in a diminution of the solvent power of the ethyl acetate. The ethyl alcohol added to our solvent acts as a balancing medium to so restrain the rate of evaporation that the latter will be relatively uniform for all components of the menstruum or solvent.

In addition to its excellent conversion properties and its uniform evaporation, our solvent possesses the valuable property of being compatible with the well known and commonly used plastifiers for cellulose acetate and other organic esters of cellulose. This is a very important factor since the use of such plastifiers, is essential in the manufacture of a large number of plastic compounds. Due to their compatibility with our solvents, these plastifiers will remain uniformly distributed throughout the plastic mass even upon evaporation of the solvents.

As previously stated other suitable compounds can replace the ethyl acetate given in the specific example. Among the compounds which we have found suitable are the acetic esters of homologous aliphatic alcohols. They should, of course, be miscible with approximately 20% of an equal part alcohol-water diluent. Also the ethyl alcohol can be replaced with other low aliphatic alcohols which will mix properly with the other ingredients of the solvent. Our solvents can be used alone or where desirable they may be mixed with other solvents or solvent mixtures provided that our solvent mixture is present in a preponderant proportion in order that the final solvent may possess the desirable properties above pointed out. Other departures from the specific example may be made without departing from the spirit of our invention.

The expression "organic esters of cellulose" used in the specification and hereinafter in the claims is to be understood as signifying those cellulose esters wherein the radicle introduced into the cellulose molecule during esterification is organic in character, such as acetyl, propyl or butyl.

Having described our invention what we claim and desire to secure by Letters Patent is:

1. A composition of matter comprising a solution of an organic acid ester of cellulose dissolved in a solvent mixture containing a low alkyl acetate, a low aliphatic alcohol and water, the proportion of the three ingredients of this solvent mixture being such that it has a good solvent power for the cellulose ester in the cold and is capable of making a clear solution of the cellulose ester.

2. A composition of matter comprising a solution of cellulose acetate dissolved in a solvent mixture containing a low alkyl acetate, a low aliphatic alcohol and water, the proportion of the three ingredients of this solvent mixture being such that it has a good solvent power for the cellulose acetate in the cold and is capable of making a clear solution of the cellulose acetate.

3. A composition of matter comprising a solution of cellulose acetate dissolved in a solvent mixture containing ethyl acetate, ethyl alcohol and water, the proportion of the three ingredients of this solvent mixture being such that it has a good solvent power for the cellulose acetate in the cold and is capable of making a clear solution of the cellulose acetate.

4. A composition of matter comprising a clear solution of cellulose acetate dissolved in a solvent mixture containing ethyl acetate, ethyl alcohol and water in such proportions that the solvent evaporates uniformly.

5. A composition of matter comprising a solution of cellulose acetate dissolved in a solvent mixture comprising approximately 82.5 parts of ethyl acetate, 8.5 parts of ethyl alcohol, and 9 parts of water.

6. Process of forming solutions of cellulose acetate comprising dissolving cellulose acetate in a solvent mixture containing ethyl acetate, ethyl alcohol and water, the proportions of the three ingredients of this solvent mixture being such that it has a good solvent power for the cellulose acetate in the cold and is capable of making a clear solution of the cellulose acetate.

7. Process of forming clear solutions of cellulose acetate comprising dissolving cellulose acetate in a solvent mixture containing ethyl acetate, ethyl alcohol and water in such proportions that the solvent evaporates uniformly.

8. Process of forming solutions of cellulose acetate comprising dissolving cellulose acetate in a solvent mixture containing approximately 82.5 parts of ethyl acetate, 8.5 parts of ethyl alcohol and 9 parts of water.

In testimony whereof, we have hereunto subscribed our names.

JAMES F. WALSH.
AMERIGO F. CAPRIO.